United States Patent [19]

Angus et al.

[11] 4,453,721

[45] Jun. 12, 1984

[54] DUAL ELEMENT SEALS WITH HYDRODYNAMIC SUPPORT

[75] Inventors: James P. Angus, Penrith; Jack Palfreyman, Derby, both of England

[73] Assignee: Rolls-Royce Limited, London, England

[21] Appl. No.: 552,369

[22] Filed: Nov. 16, 1983

[30] Foreign Application Priority Data

Dec. 14, 1982 [GB] United Kingdom ................ 8235545

[51] Int. Cl.³ .......................... F16J 15/42; F16J 15/48
[52] U.S. Cl. .......................................... 277/3; 277/25; 277/26; 277/27; 277/198; 277/DIG. 6; 277/135
[58] Field of Search ................ 277/3, 27, DIG. 6, 25, 277/26, 198, 135

[56] References Cited

U.S. PATENT DOCUMENTS

| | | | |
|---|---|---|---|
| 2,948,555 | 8/1960 | Wright | 277/26 |
| 3,970,318 | 7/1976 | Tuley | 277/26 |
| 4,161,317 | 7/1979 | Sakamaki | 277/198 X |
| 4,199,152 | 4/1980 | Catterfeld | 277/3 |
| 4,211,424 | 7/1980 | Stein | 277/25 |
| 4,330,133 | 5/1982 | Polfreyman et al. | 277/198 X |
| 4,331,337 | 5/1982 | Cross et al. | 277/27 X |

Primary Examiner—Robert S. Ward
Attorney, Agent, or Firm—Cushman, Darby & Cushman

[57] ABSTRACT

Two seal elements are respectively mounted on generally coaxial relatively rotatable members so that each seal element is capable of relative radial movment with respect to its associated member. One of the seal elements is mounted on its associated member in such a manner that they remain coaxial. The seal elements have confronting radially spaced apart surfaces which are so configured that together they define a hydrodynamic gas bearing. The arrangement is such that upon the relative rotation of the members said seal element which is mounted so as to remain coaxial with its associated member hydrodynamically supports the other seal element so that they remain coaxial.

8 Claims, 5 Drawing Figures

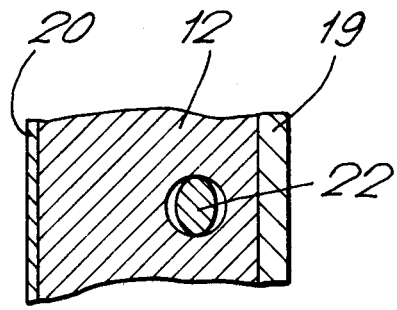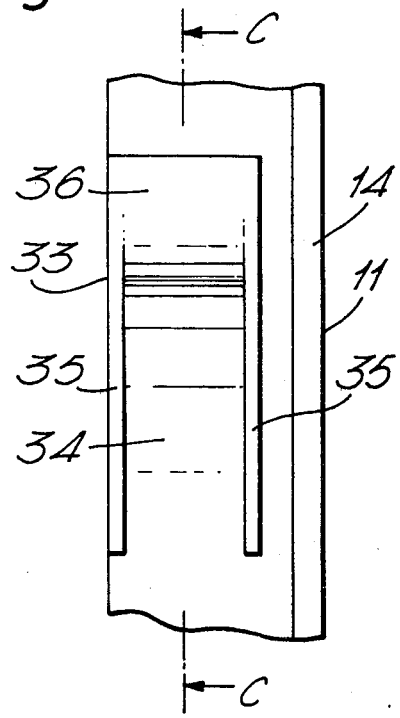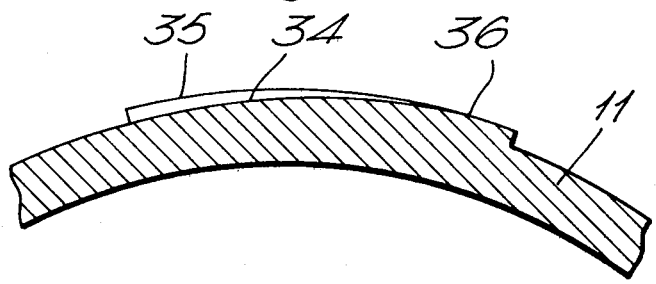

DUAL ELEMENT SEALS WITH HYDRODYNAMIC SUPPORT

This invention relates to seals and in particular to seals between relatively rotatable members.

One of the more effective ways of providing a seal between generally coaxial relatively rotatable member is to utilize a seal element which is in physical contact with the members concerned. Whilst such seals are satisfactory in applications in which the relative velocities of the members are not high, their effectiveness and life are usually drastically reduced if high relative velocities are encountered. A common way in which this problem is avoided is to provide a seal having two radially spaced apart elements, one attached to each of the relatively rotatable members. A small radial gap is defined between the seal elements so that high velocity relative rotation between the members is possible whilst leakage across the small gap is maintained at acceptably low levels. Such seals are effective if the gap between the seal elements is small and remains substantially constant. However if the axis of one of the relatively rotatable members should move for any reason, there is a danger that the seal elements will contact and damage each other.

It is an object of the present invention to provide a seal comprising two radially spaced apart elements in which the radial gap between the seal element remains substantially constant even if the axis of one of the relatively rotatable members which carry the seal element should no longer remain coaxial with the axis of the remaining relatively rotatable member.

According to the present invention, a seal suitable for sealing between two generally coaxially mounted relatively rotatable members comprises two ring-shaped seal elements having substantially similar rates of thermal expansion which are respectively mounted on said relatively rotatable members so as to be capable of rotation therewith and have confronting radially spaced apart annular sealing faces, each of said relatively rotatable members being provided with annular retaining means to axially retain said seal elements and provide a seal between each of said seal elements and the member to which it is attached whilst permitting a limited degree of relative radial movement therebetween, one of said seal elements being retained on its respective member in such a manner that they are maintained in fixed coaxial relationship, the other of said seal elements being retained on its respective member in such a manner that they are permitted to move out of coaxial relationship, said seal elements having confronting radially spaced apart annular portions which are so configured that upon the relative rotation of said relatively rotatable members, they define a hyrodynamic gas bearing, the operation of which is such that said seal element which is permitted to move out of coaxial relationship with its respective member is hydrodynamically supported by the remaining seal element in such a manner that said seal elements are maintained in coaxial relationship.

The invention will now be described, by way of example, with reference to the accompanying drawings in which:

FIG. 3 is a plan view of a portion of one of the seal elements shown in FIGS. 1 and 2.

FIG. 4 is a view on section line B—B of FIG. 1.

FIG. 5 is a view on section line C—C of FIG. 3.

Figure 1:
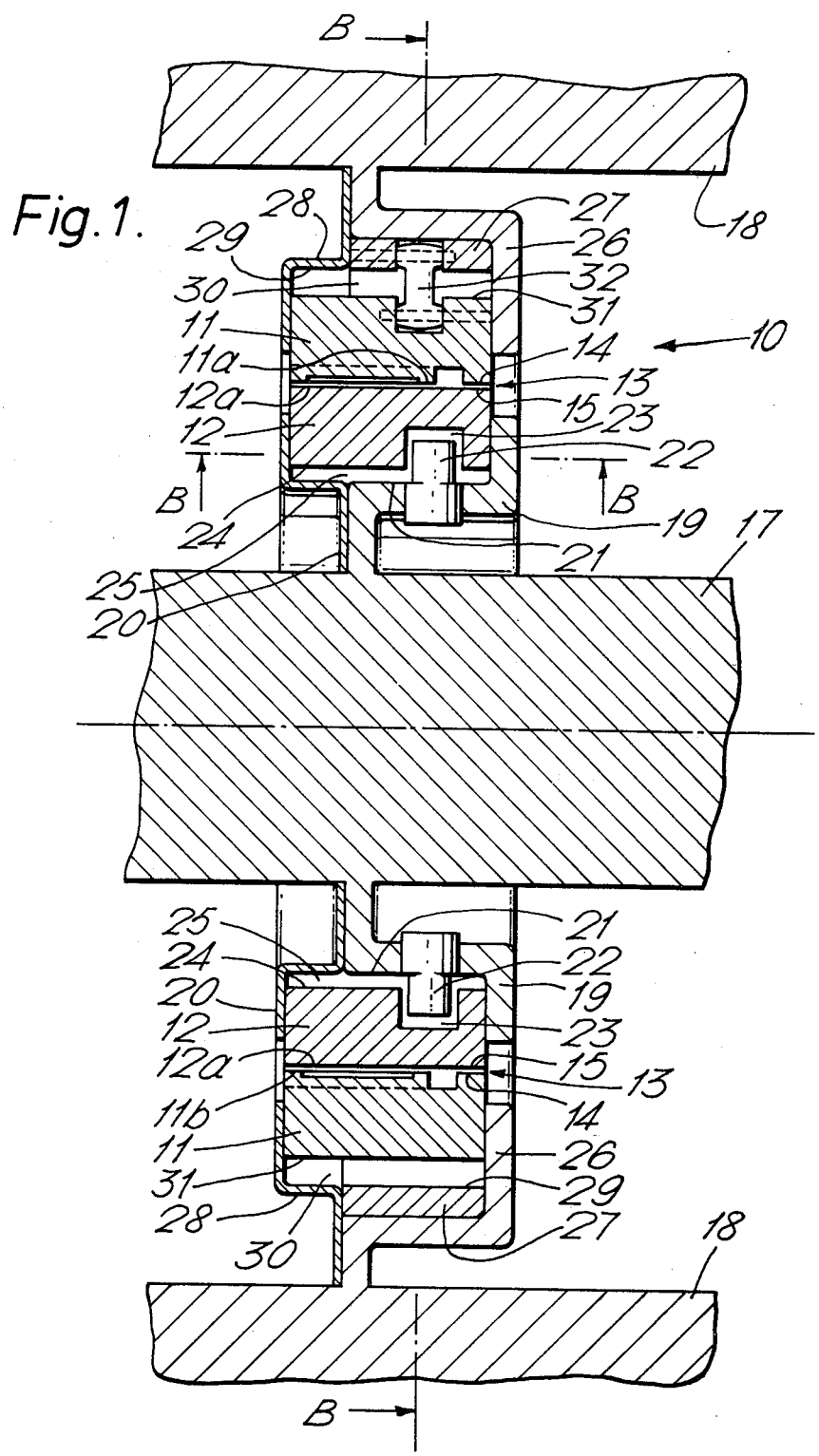
FIG. 1 is a view on section line A—A of FIG. 2 of a seal in accordance with the present invention.

With reference to FIG. 1, a seal generally indicated at 10 comprises two ring-shaped seal elements 11 and 12 respectively which are concentrically positioned with a very small radial gap 13 separating their confronting sealing faces 14 and 15. The seal elements 11 and 12 are both formed from a composite material comprising carbon fibres enclosed in a carbon matrix. This material has a high specific stiffness ensuring minimal radial growth in relation to centrifugal loads as well as a low coefficient of thermal expansion which ensures minimal variation in seal clearance with temperature variation.

Consequently if the seal elements 11 and 12 are subjected to variations in temperature, the gap 13 between them will remain substantially constant.

The seal elements 11 and 12 are coated with a ceramic in order to resist oxidation of the carbon/carbon fibre composite material at elevated temperatures. If, however, the seal 10 is not intended to operate under strongly oxidising conditions, the ceramic may be omitted. It will be appreciated that other materials having low coefficients of thermal expansion and high specific stiffness, such a ceramic composite, could be used in place of the carbon/carbon fibre composite.

The seal elements 11 and 12 provide a gas seal between two coaxially mounted relatively rotatable members 17 and 18 which are restrained (by means not shown) against relative axial movement. In this particular case both the radially inner and outer members 17 and 18 are rotatable gas turbine engine shafts. It will be appreciated however that the present invention is applicable to any combination of relatively rotatable members which are restrained against axial movement.

Figure 2:
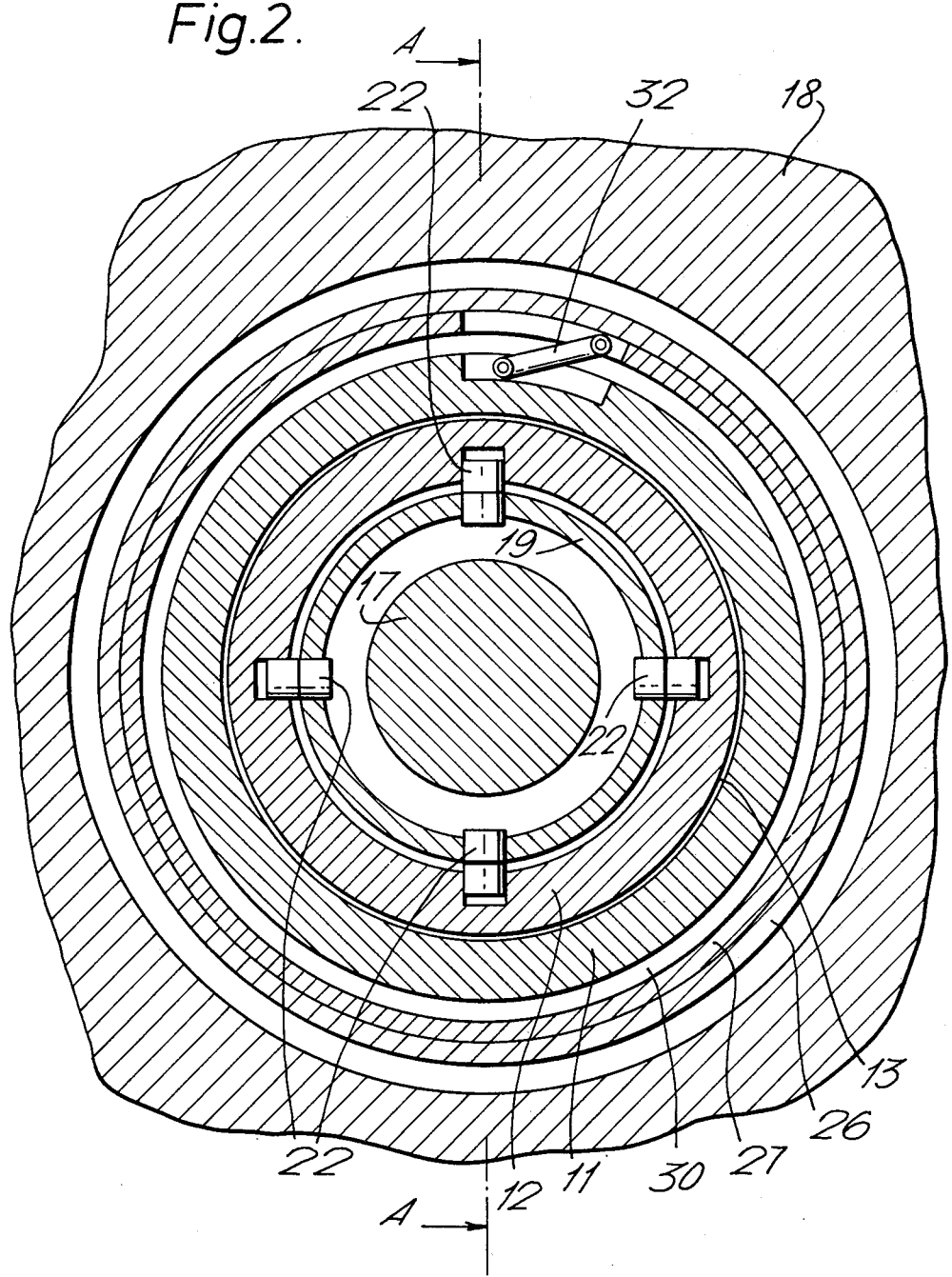
FIG. 2 is a view on section line B—B of FIG. 1.

The radially inner member 17 is provided with a radially outwardly extending flange 19 which is of cranked cross-sectional shape. A ring member 20 which is also of cranked cross-sectional shape is brazed to the flange 19 so that in combination, they define a circumferentially extending channel 21. The channel 21 receives the radially inner seal element 12 in sliding and sealing engagement so that axial movement of the seal element 12 is restrained thereby. Four equally spaced apart radially extending oval cross-section dowels 22, (as can be seen in FIG. 4) which are located in the axially extending portion of the flange 19 (as can be seen in FIG. 2) locate in corresponding holes 23 provided in the radially inner face 24 of the seal element 12. The dowell 22 ensure that the seal element 12 rotates with the member 17 and also maintain the member 17 and the seal element 12 in a coaxial relationship.

A radial gap 25 is provided between the radially inner surface 24 of the seal element 12 and the channel 21 in order to permit relative radial movement between them resulting from their differing rates of thermal expansion. The dimensions and coefficients of thermal expansion of the seal element 12, the flange 19 and ring member 20 are chosen such that the seal element 12 is not gripped by the flange 19 and ring member 20 under the thermal conditions which would be expected to be encountered during the operation of the seal 10.

The radially outer member 18 is provided with a radially inwardly extending flange 26 which is similar to the flange 19 in being of cranked cross-sectional shape. The radially inward face of the axially extending portion of the flange 26 has a ring member 27 fixed to it. A further ring member 28, which also of cranked cross-sectional shape, is brazed to the flange 26 so as to abut the ring member 27 and cooperate with the flange 26 and the ring member 27 to define a circumferentially extending channel 29. The channel 29 receives the radially outer seal element 11 in sliding and sealing engagement so that axial movement of the seal element 11 is restrained and the seal elements 11 and 12 are aligned.

A radial gap 30 is provided between the radially inner surface of the channel 29 and the radially outer surface 31 of the seal element 11 in order to permit a limited degree of radial movement between the seal element 11 and the member 18. As in the case of the channel 21, the dimensions and coefficients of thermal expansion of the seal element 11, the flange 26 and the ring member 20 are chosen such that the seal element 11 is not gripped by the flange 26 and ring member 28 under the thermal conditions which would be expected to be encountered during the operation of the seal 10.

The ring member 27 and the seal element 11 are interconnected by a single link member 32. The link member 32 is pivotally attached to the ring member 27 and the seal element 11 so that although the ring member 27 remains free to move radially within the channel 29, it cannot rotate relative to the radially outer member 18.

An annular axial portion of the radially inner face 11a of the radially outer seal element 11 has a plurality of similar lands 33 and recesses 34 provided on it, one of each of which can be seen in FIG. 3. Each recess 34 is of rectangular, tapered form as can be seen in FIG. 5, and is surrounded on three sides by a land 33. Each land 33 is aligned with the sealing face 14 and has two elongate portions 35 which define the long sides of its associated recess 34. The major portion 36 of each land 33 defines one of the short sides of its associated recess.

The lands 33 and recesses 34 cooperate with the smooth radially outer face 12a of the radially inner seal element 12 to define a hydrodynamic gas bearing. Thus upon the rotation of the radially outer member 18, and hence the seal element 11 the radially outer seal element 11 is hydrodynamically supported in the radial direction by the radially inner seal element 12. This confronting sealing faces 14 and 15.

It will be seen therefore that since the radially inner seal element 12 is constrained by the oval dowell 22 to remain coaxial with the radially inner member 17 and the gap between the confronting sealing faces 14 and 15 is constant, the radially inner and outer seal elements 12 and 11 will be coaxial. Moreover they will remain coaxial in the event of the relatively rotatable members 17 and 18 moving our of their coaxial relationship since relative radial movement is possible between the radially outer seal element 11 and the channel 29 in which it is located. In addition, since the seal elements 11 and 12 are free to thermally expand and contract in a radial sense within their respecive channels 24 and 29, then any thermal expansion or contraction of the relatively rotatable members 17 and 18 will be independent, in the radial sense, of any thermal expansion or contraction the seal elements 11 and 12. Since the radially inner and outer seal elements 11 and 12 are formed from the same material, then the gap 13 between them will remain substantially constant during temperature variations. The gap 13 may thus be arranged to be very small, thereby ensuring its sealing efficiency without the danger of the sealing faces 14 and 15 being forced into contact with each other as a result of radial loadings being imposed upon them by the radially inner and outer members 17 and 18 or by the members 17 and 18 moving out of their coaxial relationship.

We claim:

1. A seal suitable for sealing between two generally coaxially mounted relatively rotatable members comprising two ring-shaped seal elements having substantially similar rates of thermal expansion which are respectively mounted on said relatively rotatable members so as to be capable of rotation therewith and have confronting radially spaced apart annular sealing forces, each of said relatively rotatable members being provided with annular retaining means to axially retain said seal elements and provide a seal between each of said seal elements and the member to which it is attached whilst permitting a limited degree of relative radial movement therebetween, one of said seal elements being retained on its respective member in such a manner that they are maintained in fixed coaxial relationship, the other of said seal milar rates of thermal expansion which are respectively mounted on said relatively rotatable members so as to be capable of rotation therewith and have confronting radially spaced apart annular sealing forces, each of said relatively rotatable members being provided with annular retaining means to axially retain said seal elements and provide a seal between each of said seal elements and the member to which it is attached whilst permitting a limited degree of relative radial movement therebetween, one of said seal elements being retained on its respective member in such a manner that they are maintained in fixed coaxial relationship, the other of said seal elements being retained on its respective member in such a manner that they are permitted to move out of coaxial relationship, said seal elements having confronting radially spaced apart annular portions which are so configured that upon the relative rotation of said relatively rotatable members, they define a hydrodynamic gas bearing, the operation of which is such that said seal element which is permitted to move out of coaxial relationship with its respective member is hydrodynamically supported by the remaining seal element in such a manner that said seal elements are maintained in coaxial relationship.

2. A seal as claimed in claim 1 wherein said annular retaining means to axially retain said seal elements comprises means on each of said relatively rotatable members to define a circumferentially extending channel, each of said sealing elements being slidingly and sealingly mounted in its respective channel so as to be axially retained thereby.

3. A seal as claimed in claim 1 wherein one of said elements and the member on which it is mounted are provided with corresponding radially extending projections and depressions which cooperate to maintain said seal element and member in said fixed coaxial relationship.

4. A seal as claimed in claim 1 wherein said seal elements are formed from a material having a low coefficient of thermal expansion.

5. A seal as claimed in claim 1 wherein said seal elements are formed from a material having a high specific stiffness.

6. A seal as claimed in claim 1 wherein said seal elements are formed from a ceramic composite.

7. A seal as claimed in claim 1 wherein said seal elements are formed from a composite material comprising carbon fibres enclosed in a matrix of carbon.

8. A seal as claimed in claim 1 wherein said seal elements are coated with an anti-oxidation coating.

* * * * *